United States Patent [19]

Fitzgerald

[11] 4,301,449
[45] Nov. 17, 1981

[54] CONTROL PANEL

[75] Inventor: Charles A. Fitzgerald, Stone Mountain, Ga.

[73] Assignee: Fitzgerald Engineering Company, Inc., Tucker, Ga.

[21] Appl. No.: 967,111

[22] Filed: Dec. 7, 1978

[51] Int. Cl.³ ............................................. G08B 25/00
[52] U.S. Cl. ............................... 340/525; 340/286 M; 340/365 R; 340/365 VL; 340/712
[58] Field of Search ................. 340/525, 286 M, 712, 340/381, 565, 365 C, 365 R, 365 VL, 365 S, 365 L, 365 P, 365 A; 200/50 A, 61.19, 302

[56] References Cited

U.S. PATENT DOCUMENTS

| | | | |
|---|---|---|---|
| 2,804,607 | 8/1957 | Nalle | 340/286 M |
| 2,930,939 | 3/1960 | Swanson | 340/286 M |
| 2,948,074 | 8/1960 | Dupree | 40/546 |
| 2,984,725 | 5/1961 | Hubbell et al. | 200/302 |
| 3,090,855 | 5/1963 | Morse | 200/302 |
| 3,296,404 | 1/1967 | Stevens | 200/302 |
| 3,573,792 | 4/1971 | Reed | 340/286 M |
| 3,624,648 | 11/1971 | Willoughby | 340/525 |
| 3,673,579 | 6/1972 | Graven | 340/712 |
| 3,754,245 | 8/1973 | Peprnik | 340/286 M |
| 3,932,721 | 1/1976 | Crowell et al. | 200/302 |
| 4,032,931 | 6/1977 | Haker | 340/365 R |

*Primary Examiner*—John W. Caldwell, Sr.
*Assistant Examiner*—Donnie L. Crosland
*Attorney, Agent, or Firm*—Jones, Thomas & Askew

[57] ABSTRACT

A control panel for displaying, monitoring and controlling conditions of a process plant, the control panel includes a graphic display, and permits quick and easy rearrangement and repositioning of control switches associated with the graphic display. The control switches are mounted behind a graphic display panel without extending through the display panel, and the control switches are actuated by the presence of an object such as an operator's finger at the outside of the display panel. The control switches may be magnetically secured in place, so as to permit ease of repositioning.

12 Claims, 4 Drawing Figures

U.S. Patent  Nov. 17, 1981  4,301,449
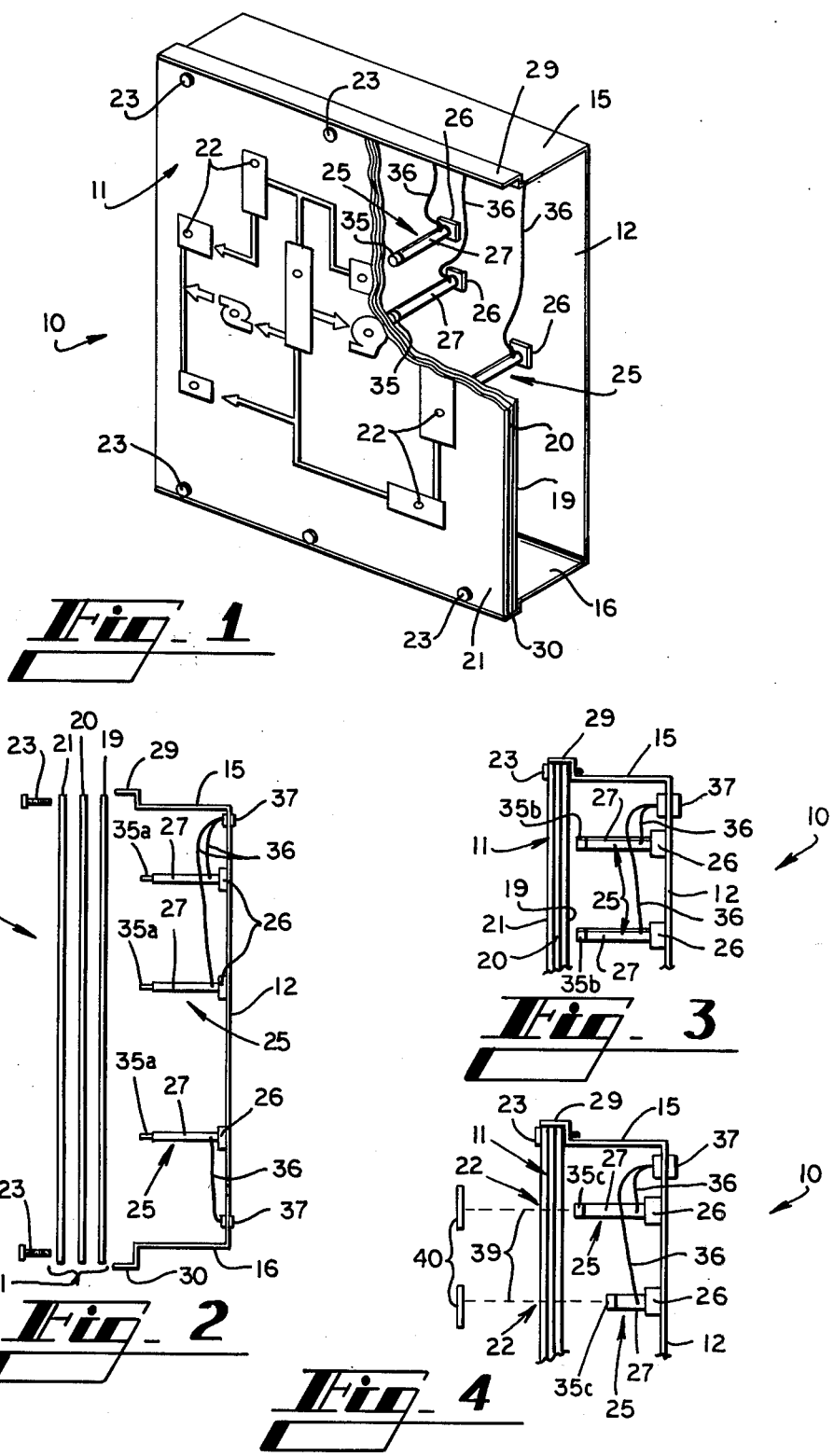

CONTROL PANEL

BACKGROUND

The present invention relates in general to a control panel for controlling conditions of a process plant, and more specifically to a system for positioning and operating the control devices of the control panel relative to the display and monitoring devices.

Annunciator systems have been developed for monitoring and displaying operating conditions in complex process plant systems. The typical annunciator system might include a plurality of gages for indicating variable parameters such as pressures, temperatures quantities, or the like for illustrating the various conditions in the process plant. When a complex process is displayed by an annunciator system, the various details and indicators may be so many in number and so complex in their arrangement that a graphic display is desirable in order for the plant operators to understand and easily read the various indicators. A graphic display of this type might include a translucent panel positioned in or near the annunciator cabinet which carries symbols that represent pumps, valves, liquid levels, pressures, and other plant equipment and conditions, and flow lines extending between the various symbols. The various symbols on the display panel are illuminated by lamps placed behind the display panel, and the light emitted from the lamps would represent various plant conditions. For instance, when a lamp illuminates the symbol of a pump on the display panel, it would indicate a certain condition existing in a corresponding pump in the process plant; e.g., if the pump were in operation, overheated, or not operating properly. Similarly, a lamp might be utilized to illuminate the symbol of a storage tank to indicate an empty, properly filled, or an overfilled condition in the storage tank. Associated with such annunciator systems are control systems by which the process plant can be controlled in response to the conditions indicated by the annunciator display and monitoring operations.

Often times, the control system includes a separate array of switches or other control devices disassociated from the graphic display of the annunciator system. That is, the switches are arranged on a separate control panel located at some point removed from the graphic display. Certain of the symbols on the graphic display may correspond with certain of the switches of the switching panel. When the operator desires to control a condition within the process plant which is indicated by a certain symbol on the graphic display, the operator must search out the corresponding switch on the control panel in order to actuate the indicated condition. In such control systems with switches disassociated from the graphic display, precious seconds can be wasted in properly relating the graphic display symbol or function and the corresponding switch. Once a symbol on the graphic display is lit up, for example, the operator must search the separate control panel for the appropriate corresponding switch. Furthermore, the separate control panel and graphic display set in a control room occupy a great deal of space, much of which could be conserved if the separate control panel was eliminated.

Other control systems include switches which are mounted directly onto and protrude from the graphic display of the annunciator system, in locations which coincide with the symbolic representation of the process or condition that is controlled by each such switch. One practice is to bore a hole through the graphic display panel and attach, extending therethrough, a button or toggle switch or similar type switch. The switch protrudes from the display adjacent the corresponding symbol or sometimes replaces the symbol itself. In such control systems with switches mounted directly to the graphic display panel, the ability to vary the process plant display (or flow chart) is very limited and costly. Each time the operational process of the plant is to be varied, e.g., a pump moved or valve sequence rearranged, a new display panel must be constructed or else new holes must be bored and old holes plugged in the existing panel.

Examples of typeical graphic display annunciator systems and related control devices of the prior art are shown by way of example in U.S. Pat. Nos. 3,624,648 to Willoughby, and 3,754,245 to Peprnik.

SUMMARY OF THE INVENTION

Stated in general terms, control panels according to the present invention include switches which are selectably positioned behind the symbolic display panel and which do not extend through that panel. The switches are actuated by the presence of an actuating member or the like on the front of the display panel. The switches may preferably be mounted behind the display panel in a manner which permits the switches to be readily repositionable without cutting holes or otherwise permanently disfiguring a mounting member. Stated somewhat more specifically, the control panel comprises generally a backing panel and a display panel in spaced relationship to one another with control switches removably mounted to the backing panel between the backing panel and display panel. The display panel typically includes a graphic flow chart or display of an operating process or apparatus, with symbols and flow lines representing equipment or its operation. The switches of the control panel are unattached to the display panel and do not extend through the plane of the control panel. Since the switches are removably mounted to the backing panel, they are each positionable in an infinite number of locations anywhere on the backing panel so as to be locatable immediately behind an appropriate corresponding symbol on the display panel. The switches of the present invention thus do not protrude through the display panel, and can be repositioned without leaving holes in an existing control panel. The switches may be any device, including pressure sensitive proximity and photoelectric devices, which may be operated through the display panels by the presence of an operator's finger or by an actuating device at or adjacent the display panel.

Therefore, it is an object of the present invention to provide an improved control display panel.

It is another object of the present invention to provide a single integral control panel from which a process plant can be displayed, monitored and controlled.

It is another object of the present invention to provide a control panel including switches mounted behind a graphic display panel.

Another object of the present invention is to provide a control panel in which the graphic display and corresponding switches can be easily and quickly changed.

Yet another object of the present invention is to provide control switches for a control panel which can be removably mounted in an infinite number of positions on a backing panel behind a graphic display panel unattached to the graphic display panel and which are operated in response to the presence of an object at or adjacent the display panel.

Other objects, features and advantages of the present invention will become apparent upon reading the following specification when taken in conjunction with the accompanying drawings.

BRIEF DESCRIPTION OF THE DRAWINGS

FIG. 1 is a pictorial view of a control panel according to a disclosed embodiment of the present invention.

FIG. 2 is a partially exploded side view of the embodiment shown in FIG. 1.

FIG. 3 is a partial side view of a second disclosed embodiment of the control panel according to the present invention.

FIG. 4 is a partial side view of a third embodiment according to the present invention.

DETAILED DESCRIPTION

Referring now in more detail to the drawings in which like numerals represent like components throughout the several views, FIG. 1 shows the control panel 10 which comprises a graphic display panel 11, a backing panel 12, and a number of control switches 25 located between the two panels 11, 12. The backing panel 12 and display panel 11 are held in a spaced apart relationship relative to one another by top spacer wall 15 and bottom spacer wall 16.

The display panel 11, in the embodiments disclosed herein, is an assembly comprising a support sheet 19, a display sheet 20, and an outer sheet 21. Display sheet 20 carries the graphic display of the plant process including symbols which typically represent elements such as pumps, storage tanks, valves, switches and other elements utilized to control and operate the process plant. Various of the symbols include a trigger zone 22 the function of which is explained later. The trigger zone 22 is of no particular configuration or design but rather is any zone or point, which is somehow indicated on the graphic display and which corresponds in location and in symbolic control function with one of the control switches 25 behind the display panel 11. The three sheets 19, 20, 21 are placed one on top of the other to define the laminated display panel 11 and are attached by screws 23 to flange portions 29, 30 of the top and bottom spacer walls 15, 16. The laminated display panel 11 can alternatively be removably attached to the top and bottom walls 15, 16 by suitable techniques which do not require fasteners such as the screws 23 or the like. The support sheet 19 forms the rear side of the display panel 11 and the outer sheet 21 forms the front side of the display panel.

The outer sheet 21 should be at least translucent, and is preferably clear so that the graphic display carried by the display sheet 20 can be seen through the outer sheet. The display sheet 20 and the support sheet 19 can be translucent, transparent or opaque. One factor in determining the desired degree of transparency of the two rear sheets 20, 21 is whether or not portions of the display sheet 20 are to be illuminated by lighting located behind the display panel 11. For example, the display sheet 20 may be of a white opaque material such as Mylar or the like, to which is applied artwork symbols of one or more contrasting colors. The relative rigidities of the three sheets 19, 20, 21 may be varied as a matter of design choice or as necessitated by parameters such as the type of control switches employed as will be discussed later. One example of a preferred construction of the display panel includes a clear plexiglass support sheet 19, a clear plexiglass outer sheet 21 and a display sheet 20 of paper or Mylar.

Control switches 25 are positioned within the space between the backing panel 12 and display panel 11 and do not pass through the plane of the display panel. Each switch 25 comprises a base 26 by which the switch is mounted to the backing panel 12 and a body portion 27 by which the switch extends out from the backing panel to bring the actuator component 35 of the switch 25 into position adjacent the support sheet 19 of the display panel 11. Each switch 25 is to be removably located behind the display panel 11 in alignment with one of the trigger zones 22 on the graphic display. Each control switch 25 is connected by wires 36 to a terminal box 37. It is preferable that the base 26 of each switch 25 be removably mountable to the backing panel 12 and that the actuator component 35 of the switch be positionable in a location, usually adjacent the display panel, where the actuator component can be activated by or in response to the presence of an object at the front side of the display panel. The backing panel 12 is preferably of steel and the switch bases 26 are magnetic, so as to permit the positioning of each switch 25 at an infinte number of positions relative to the display panel. It is understood as being within the scope of this invention that the base 26 and backing panel 12 can be made of any materials which cooperate to removably mount the switch base in an infinite number of positions, anywhere on the backing panel.

In a first embodiment of the present invention, the control switches 25 employed comprise pressure sensitive actuator components 35 such as the button switch 35a shown in FIG. 2. In this embodiment, the three display panel sheets 19, 20, 21 are each made of an impressionable material through which a force manually exerted at a localized point on the outer sheet 21, such as by finger pressure applied to the outer panel sheet of the display panel, is transmitted through the three sheets to actuate the button switch 35a located in alignment with the point of force behind the support sheet 19.

Operation of the first embodiment is as follows: The graphic display, including appropriate trigger zones 22, is laid out on the display sheet 20, preferably using peel-off decals or the like, and display sheet 20 is placed between the outer sheet 21 and support sheet 19 to form the display panel 11. There are no holes, other than holes for screws 23, in any of the sheets 19, 20, 21 through which objects such as a finger are to be inserted or from which switches protrude. The trigger zones 22 are themselves only symbols within the graphic display. Once the graphic display has been completed, control switches 25 are mounted to the inside of the backing panel 12 at locations where the sensitive actuator component 35 of each switch is in alignment with a corresponding trigger zone 22 on the display. Each button switch 35a is located closely adjacent the support sheet 19 when the display panel 12 is in its mounted position, even lightly touching the sheet if desired. In this way, the button switch can be depressed in response to pressure being applied at the corresponding trigger zone. Once the control switches 25 have been properly positioned, the laminated display panel 11 is attached, in its mounted position, to the flanges 29, 30 of the spacer walls 16, 17 by screws 23.

By virtue of their magnetic bases 26, the control switches 25 can be easily removed and repositioned on the backing panel 12 in order to accurately align the switch component 35 with its corresponding trigger zone 22. Oftentimes the plant process is altered or for some other reason the graphic display must be varied, and the trigger zones 22 rearranged. In such an event, the control switches 25 can be easily removed and repositioned on the backing panel 12 to align with the new position of the corresponding trigger zone 22.

A second embodiment of the present invention is represented in FIG. 3. The control switch 25 in this embodiment comprises a proximity device switching component 35b which operates in response to the presence of an object, for example, a finger of the operator, in the "proximity" of the component. The switching component 35b is positioned near enough to the rear of support sheet 19 that the proximity device will be triggered by the presence of an actuating member at or near the corresponding trigger zone 22. The three sheets 19, 20, 21 of display panel 11 may, if desired, be of rigid material since triggering of the switches is not dependent upon a force applied at the outer sheet 21. One example of such a proximity switch is a reed relay which is magnetically actuated. The actuating member could be a wand having a magnetic tip which actuates the switch when the trigger zone is touched. Other examples of proximity switches are temperature or capacitive sensitive, and are actuated by the presence of a human finger at the trigger zone. It is recognized relative to this embodiment of the invention that a delay mechanism (not shown) may be necessary in conjunction with the proximity device switching components. The delay mechanism, if employed, would prevent operation of the related control or function by triggering of a control switch 25 in response to the casual passage (less than a prescribed time) of an object past the triggering zone 22. Such delay mechanisms are in the nature of time delay devices and are known to those skilled in the art.

A third embodiment of the control panel 10 of the present invention is represented in FIG. 4. The control switches 25 in this embodiment comprise photoelectric switching components 35c. Each combination light source and photoelectric switching component 35c includes a light detector. Each switching component 35c is positioned in alignment with a corresponding trigger zone 22 in the form of a light-transmissive window through the panel 11, such that the light source emits a light beam 39 which passes through the trigger zone and is reflected by the reflective surface 40 (comprising an actuating member) back through the trigger zone window to be received by the light detector of the photoelectric component 35c. The control switch 25 of this third embodiment is, therefore, triggered by the presence of an object over the corresponding trigger zone which interferes with the light beam 39. The sheets 19, 20, 21 of the display panel 11 may, if desired, be of rigid material and should be of sufficient translucence at the trigger zones to allow passage of the light from the source 40.

It is contemplated that the photoelectric switching component can alternatively be simply a photosensitive device, and that the "source" of light can be the ambient illumination which exists in front of the panel 11. It is also recognized that a delay mechanism (not shown) as aforementioned may be necessary in conjunction with the photoelectric switching components 35c of this third embodiment of the invention. The contemplated delay mechanism would prevent operation of the related process plant machinery by the triggering of a control switch 25 in response to the momentary (less than a prescribed time) interference of a light beam 39 by a casually passing object, such as a hand.

Those skilled in the art will realize that indicator lamps and other devices, in addition to control switches 25, can be positioned within the space between the backing panel 12 and the display panel 11, without affecting the nature or the operation of control switching according to the present invention.

While this invention has been described in specific detail with particular reference to preferred embodiments thereof, it will be understood that variations and modifications can be effected within the spirit and scope of the invention as described hereinbefore and as defined in the appended claims.

I claim:

1. A control panel for controlling conditions of a process or the like, and including a display panel with indicia displayed thereon, the combination therewith comprising:

at least one trigger zone indicated on the display panel; and at least one control means positioned behind said display panel and not extending through the display panel, said control means being selectably movable behind the display panel and positionable in an infinite number of locations relative to said display panel, each said control means including switch means sensitive to the presence of an object at said trigger zone of the display panel for creating a control signal in response to the presence of an object at said trigger zone.

2. A control system for controlling operating conditions of a process or the like, said control panel comprising:

a display panel including a plurality of trigger zones indicated thereon;

a backing panel mounted behind said display panel;

a plurality of control means releaseably mounted against said backing panel adjacent the back side of said display panel, each said control means being movable about said backing panel and positionable in an infinite number of locations on said backing panel and not extending through the display panel; and each said control means comprising a switch means sensitive to the presence of an object at one of said trigger zones for creating a control signal in response to the presence of an object adjacent said trigger zone.

3. Control panel as in claim 2 and wherein said display panel comprises a support sheet disposed between two sheets of clear material, said trigger zones being displayed on said support sheet.

4. Control panel as in claim 1 or 2 and wherein said display panel is impressionable by force applied to said display panel.

5. Control panel as in claim 4 and wherein each said switch means comprises pressure sensitive switching means adjacent one of said trigger zones of said display panel, said pressure sensitive switch means creating said control signal in response to force being applied to one of said trigger zone of said display panel to bring said display panel into contact with said pressure sensitive switching means.

6. Control panel as in claim 1 or 2 and wherein each said switch means comprises a proximity responsive device adjacent one of said trigger zones of said display panel, said proximity device creating said control signal in response to the sensed presence of a predetermined actuating means in the proximity of one of said trigger zones.

7. Control panel as in claim 1 or 2 and wherein each said switch means comprises a radiation detector detecting the presence of radiation from outside said display panel, and said switch means is operative to provide said control signal in response to interruption of said radiation by an object outside said display panel in position to block passage of said radiation through said display panel to said radiation detector.

8. The control panel as in claim 1, wherein:
said trigger zone is capable of transmitting a selected radiation through said display panel; and
said switch means comprises a radiation detector responsive to said selected radiation received through said trigger zone and operative to provide said control signal whenever said radiation is blocked from passing through said trigger zone.

9. Control panel apparatus having an infinitely positionable control means, comprising:
display panel means having a front side on which is displayed indicia corresponding to a control funtion, and having a back side;
a backing panel which is mounted in assembly with said display panel in spaced apart relation to said back side thereof;
at least one control means which is selectably mountable at any desired location on said backing panel; and
said control means including activation means which is located adjacent and in unattached relation to said back side of said display panel in predetermined relation to said indicia on said front side, said control means being operative to change a control signal condition in response to the presence of a predetermined condition applied at said front side of said control panel at the location of said indicia.

10. Apparatus as in claim 9, wherein
said backing panel is made of a ferromagnetic material; and
said control means comprises a magnetic portion which removably mounts the control means anywhere on said backing panel.

11. Apparatus as in claim 9 or 10 wherein said backing panel is substantially coextensive with said back side of said display panel, so that said control means can be selectably mounted on said backing panel in predetermined relation to any desired location on said display panel means.

12. A control panel for controlling conditions of a process or the like, comprising:
a display panel with indicia displayed thereon;
said indicia including at least one trigger zone indicated on the display panel; and
at least one control means positioned behind said display panel in predetermined relation to said trigger zone on the display panel and not extending through the display panel, said control means including means positioned behind said display panel and sensitive to the presence of an object in front of the display panel at said trigger zone of the display panel for providing a control signal in response to the presence of the object at said trigger zone.

* * * * *